No. 737,946. PATENTED SEPT. 1, 1903.
G. L. MARTIN.
SUPPLEMENTAL BASE FOR OUTLET BOXES.
APPLICATION FILED MAR. 4, 1903.
NO MODEL.

Witnesses
C. H. Bertholf
Anthony Schlotter

George L. Martin.
Inventor
By his Attorney Garry P. Van Wye

No. 737,946.                                                Patented September 1, 1903.

UNITED STATES PATENT OFFICE.

GEORGE L. MARTIN, OF NEW YORK, N. Y.

SUPPLEMENTAL BASE FOR OUTLET-BOXES.

SPECIFICATION forming part of Letters Patent No. 737,946, dated September 1, 1903.

Application filed March 4, 1903. Serial No. 146,228. (No model.)

*To all whom it may concern:*

Be it known that I, GEORGE L. MARTIN, a citizen of the United States, residing at New York, in the county and State of New York, have invented a new and useful Supplemental Base for Outlet-Boxes, of which the following is a specification.

This invention relates to electric-light fixtures, and especially to outlet-boxes for marine work; and the object thereof is to provide a supplemental base of special construction that can be applied to boxes of different sizes and shapes and at the same time provide means to hold the gasket firmly in position.

I accomplish the objects of my invention by the construction illustrated in the accompanying drawings, in which—

Figure 1:
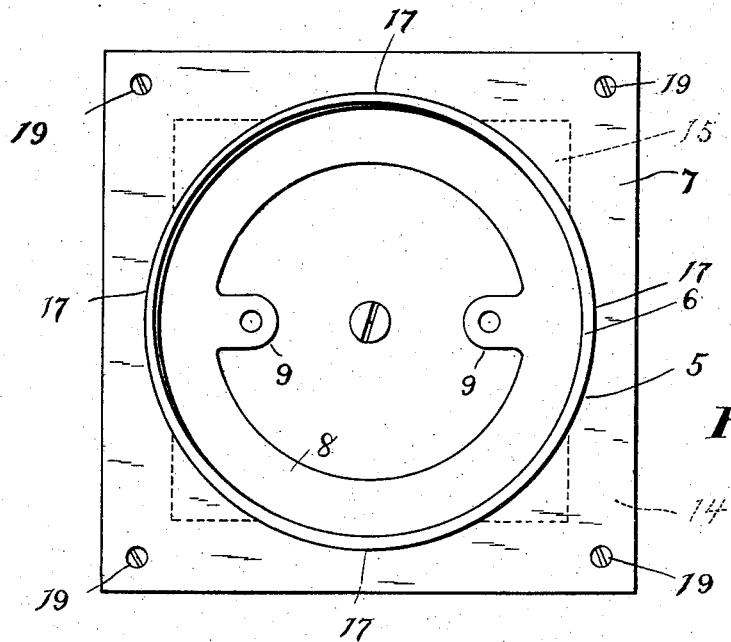
Figure 2:
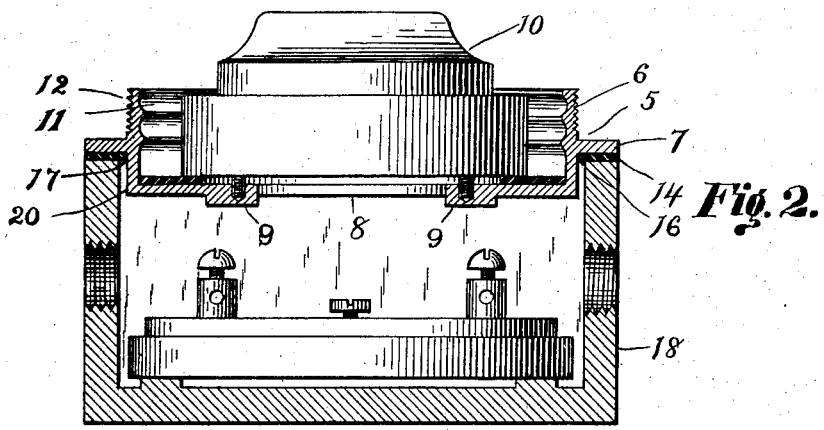

Figure 1 is a plan view of the supplemental base in position on an outlet-box, and Fig. 2 is a transverse vertical section of the same with the lamp-base in position.

In the accompanying drawings like numerals of reference refer to the same parts in each of the views, and in the practice of my invention I provide a supplemental base 5, having an annular portion 6, with a median external flange 7 and an interior flange 8 at the base thereof having lugs 9, on which the lamp-base 10 rests, as shown in Fig. 2. The annular portion 6 is provided with an interior thread 11 for the glass globe (not shown) and with an exterior thread 12 for the guard. (Not shown.) The gasket 14 extends to the outer edge of the flange 7 and is provided with a rectangular opening 15, as indicated by dotted lines in Fig. 1, which opening is less each way than the exterior diameter of the part 6, so that centrally of each side of the gasket a circular recess must be cut in the gasket of the same shape as the segment of the part 6, which is embedded in the same, said recess being shown at 16 in Fig. 2 and coinciding with the segmental parts 17 in Fig. 1.

In operation the supplemental base is mounted on the outlet-box 18, which may be square, as shown in the drawings, or may be of any other desired shape, and is secured thereto by screws 19 or in any manner desired. As the flange 7 is median of the annular part 6, a part of the annular part 20 will rest within the outlet-box 18, thereby bringing the lamp-base closer to the bottom of the box than if a straight-bottomed base and flange were used. The gasket 14 is placed in position, and when the screws 19 are secured in position the gasket 14 will be held at the corners, and the central part of each side of the gasket bears against the annular part 6, so that it cannot be forced into the outlet-box by any external pressure. This is a very important feature, for the reason that there is no force within the outlet-box to force the gasket outward; but there is liable to be great force exerted against the outside edges of the gasket to force the same inward, and as the edges of the outlet-box are usually not very thick a very little displacement would allow the water to enter the box. The part 20 of the annular part 6 forms a very effective support to the central part of each side of the gasket, especially when this part is nearly as large in diameter as one of the interior walls of the box, so that the gasket is recessed, as shown in the drawings. By having the annular part 6 extend down into the box the lamp, globe, and guard are brought closer to the support and the entire fixture is made more compact in form.

Having thus described my invention, what I claim as new, and desire to secure by Letters Patent, is—

1. The combination with a polygonal-shaped outlet-box of a supplemental base consisting of a cylindrical part having a support for the lamp-base at the bottom thereof, an exterior, supporting-flange between the top and bottom thereof, an interior screw-thread, and an exterior screw-thread above said supporting-flange, for the purpose set forth.

2. The combination with a polygonal-shaped outlet-box, of a supplemental base consisting of a cylindrical part having an inwardly-directed flange at the bottom thereof, and an exterior flange between the top and bottom thereof corresponding in shape to the box in cross-section, and a gasket mounted between the top of the box and the cover, said gasket being proportioned in size so that the central part of each side thereof will bear against said cylindrical part, as and for the purpose set forth.

3. The herein-described outlet-box and supplemental base therefor comprising an outlet-box, a supplemental base having an annular part less in diameter than the interior of the box, and a supporting-flange between the top and bottom of the exterior thereof, and a gasket between the top of said box and said flange, the central part of each side of said gasket bearing against the lower part of said annular part, as and for the purpose set forth.

In testimony whereof I have signed my name to this specification in the presence of two subscribing witnesses.

GEORGE L. MARTIN.

Witnesses:
ANTHONY SCHLATTER,
HARRY H. CASEY.